(12) United States Patent
Matsusue

(10) Patent No.: US 11,682,780 B2
(45) Date of Patent: Jun. 20, 2023

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/647,645

(22) Filed: Jan. 11, 2022

(65) Prior Publication Data

US 2022/0285710 A1    Sep. 8, 2022

(30) Foreign Application Priority Data

Mar. 5, 2021   (JP) .............................. JP2021-035315

(51) Int. Cl.
*H01M 8/04* (2016.01)
*H01M 8/04746* (2016.01)
*H01M 8/04089* (2016.01)
*H01M 8/04082* (2016.01)
*H01M 8/0438* (2016.01)

(52) U.S. Cl.
CPC ... *H01M 8/04753* (2013.01); *H01M 8/04097* (2013.01); *H01M 8/04201* (2013.01); *H01M 8/04388* (2013.01)

(58) Field of Classification Search
CPC ......... H01M 8/04753; H01M 8/04097; H01M 8/04201; H01M 8/04388
See application file for complete search history.

(56) References Cited

U.S. PATENT DOCUMENTS

| 2012/0107711 A1 | 5/2012 | Tomita et al. |
| 2014/0170518 A1 | 6/2014 | Kim et al. |
| 2018/0166716 A1* | 6/2018 | Imanishi ........... H01M 8/04298 |

FOREIGN PATENT DOCUMENTS

| JP | 2014120466 A | 6/2014 |
| WO | 2011004780 A1 | 1/2011 |

* cited by examiner

*Primary Examiner* — Olatunji A Godo
(74) *Attorney, Agent, or Firm* — Dickinson Wright, PLLC

(57) ABSTRACT

A fuel cell system that can offer fuel efficiency and water drainage performance which are compatible with each other, the fuel cell system including a fuel cell stack; a fuel gas supply device; a gas-liquid separator; a pressure measuring device; and a controlling unit, wherein the controlling unit controls pulsed operation of the fuel gas supply device in such a way that a measured pressure is within the range of a preset upper limit pressure and lower limit pressure, and the controlling unit uses a flow rate increasing control at least once when the pressure rises in the pulsed operation before the pressure reaches the upper limit pressure, as long as the pressure does not exceed the upper limit pressure, the flow rate increasing control being to increase the supply of the fuel gas supplied by means of the fuel gas supply device.

3 Claims, 5 Drawing Sheets

Fig. 3
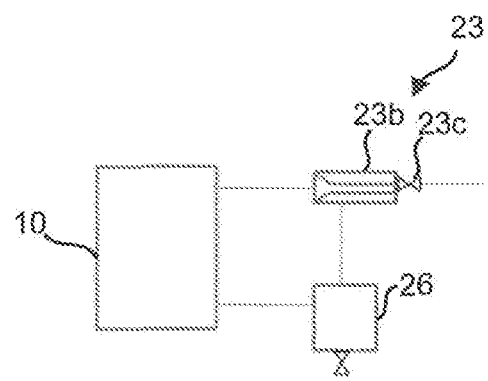
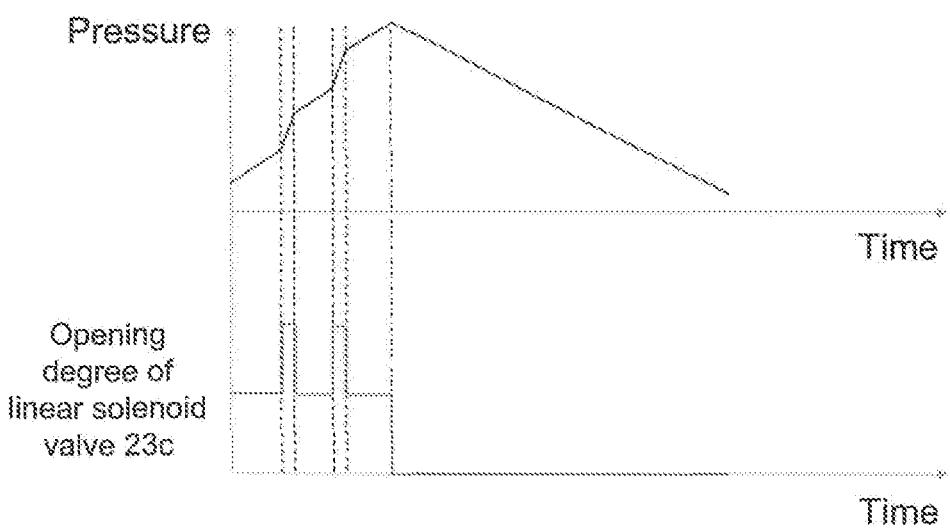

FUEL CELL SYSTEM

FIELD

The present application discloses a fuel cell system.

BACKGROUND

A fuel cell system is a system for supplying a fuel gas and an oxidant gas to a fuel cell stack to generate electricity. In general, the fuel cell system is provided with a fuel cell stack, a fuel gas supply device configured to supply a fuel gas to an anode of the fuel cell stack, and an oxidant gas supply device configured to supply an oxidant gas to a cathode of the fuel cell stack.

In the fuel cell system, normally, pulsed operation is periodically performed by means of the fuel gas supply device. The purpose of such pulsed operation is to control the supply of the fuel gas to the fuel cell stack in order to control the amount of power generation of the fuel cell stack, and also to drain water generated by the power generation from the fuel cell stack.

For example, Patent Literature 1 discloses a pulsating operation method for a fuel cell system, the method comprising: performing a pulsation control that controls a magnitude and a period of a pulsating operating pressure for fuel supplied to an anode of a fuel cell during an opening period of a hydrogen purge valve connected to an anode outlet to maintain water discharge in the anode and fuel utilization of the anode. The technique in Patent Literature 1 is capable of smoothly discharging water remaining in the anode, and also maximizing the fuel utilization of the anode.

Patent Literature 2 discloses a control device for a fuel cell power plant that controls an anode gas supply mechanism to cause an anode gas pressure in a fuel cell stack to pulsate between an upper limit pressure and a lower limit pressure; and corrects the lower limit pressure in an increasing direction when the hydrogen supply amount does not satisfy the amount required to generate the target generated power. The technique in Patent Literature 2 is capable of quickly recovering the generated power of the fuel cell stack even when flooding occurs.

CITATION LIST

Patent Literature

Patent Literature 1: JP 2014-120466 A
Patent Literature 2: WO 2011/4780 A1

SUMMARY

Technical Problem

In the technique in Patent Literature 1, the magnitude and period of the pulsating operating pressure are controlled for improving water drainage performance. Here, too much an increased upper limit pulsating operating pressure causes hydrogen to be supplied in a larger amount than the hydrogen amount required of the fuel cell stack, which may lead to deteriorated fuel efficiency and an increased amount of fuel gas cross leakage. This also leads to a longer time to reach the lower limit pressure (gas supply suspension period), which may lead to formation of a portion in the fuel cell stack where the fuel gas runs short. Further, use of a gas supply device having a large injection flow rate for shortening the period (speeding up the rise in pulsating operating pressure) lowers the proportion of circulating flow rate, which may lead to a state where hydrogen runs short in the fuel cell stack during the gas suspension period.

Patent Literature 2 describes correcting the upper limit of the pulsation pressure in the increasing direction as well when the lower limit thereof is corrected in the increasing direction. It is difficult to solve the above-described problems according to Patent Literature 2.

In view of the above circumstances, an object of the present application is to provide a fuel cell system that can offer fuel efficiency and water drainage performance which are compatible with each other.

Solution to Problem

The present disclosure is provided with, as one means for solving the above problems, a fuel cell system comprising: a fuel cell stack; a fuel gas supply device for supplying a fuel gas to the fuel cell stack; a fuel gas supply passage connecting the fuel cell stack and the fuel gas supply device; a gas-liquid separator configured to separate a liquid component from the fuel gas drained from the fuel cell stack; a fuel gas draining passage connecting the fuel cell stack and the gas-liquid separator; a circulation passage connecting the gas-liquid separator and the fuel gas supply device; a pressure measuring device disposed in any of the fuel gas supply passage, the fuel gas draining passage and the circulation passage; and a controlling unit, wherein the controlling unit controls pulsed operation of the fuel gas supply device in such a way that a pressure measured by means of the pressure measuring device is within a range of a preset upper limit pressure and lower limit pressure, and the controlling unit uses a flow rate increasing control at least once when the pressure rises in the pulsed operation before the pressure reaches the upper limit pressure, as long as the pressure does not exceed the upper limit pressure, the flow rate increasing control being to increase a supply of the fuel gas by means of the fuel gas supply device.

In the fuel cell system, the fuel gas supply device may include a linear solenoid valve, and the controlling unit may adjust an opening degree of the linear solenoid valve to use the flow rate increasing control. Alternatively, the number of the disposed fuel gas supply device may be plural, and the controlling unit may control the fuel gas supply device in such a way that at least one of the fuel gas supply device performs the pulsed operation, and the flow rate increasing control may be used by means of at least one of the rest of the fuel gas supply device. Further, the controlling unit may use the flow rate increasing control when a temperature of the fuel cell stack is lower than a predetermined threshold.

Advantageous Effects

In the fuel cell system according to the present disclosure, a flow rate increasing control to increase the supply of the fuel gas by means of the fuel gas supply device is used at least once when the pressure rises in the pulsed operation before the pressure reaches the upper limit pressure, as long as the pressure does not exceed the upper limit pressure. Such a flow rate increasing control can momentarily increase the amount of the fuel gas supplied to the fuel cell stack, to efficiently drain water from the inside of the fuel cell stack. Such a flow rate increasing control is used as long as the pressure does not exceed the upper limit pressure for the pulsed operation, which does not deteriorate fuel efficiency or hardly increase the amount of hydrogen cross leakage. In addition, such a flow rate increasing control is a method capable of relatively ensuring the proportion of circulating flow rate, which thus hardly increase formation of a portion where the fuel gas runs short in the fuel cell stack during the gas supply suspension period. Therefore, the fuel cell system according to the present disclosure can offer fuel efficiency and water drainage performance which are compatible with each other.

BRIEF DESCRIPTION OF DRAWINGS

FIG. 3 shows one example of structure for a flow rate increasing control.

DESCRIPTION OF EMBODIMENTS

Figure 1:
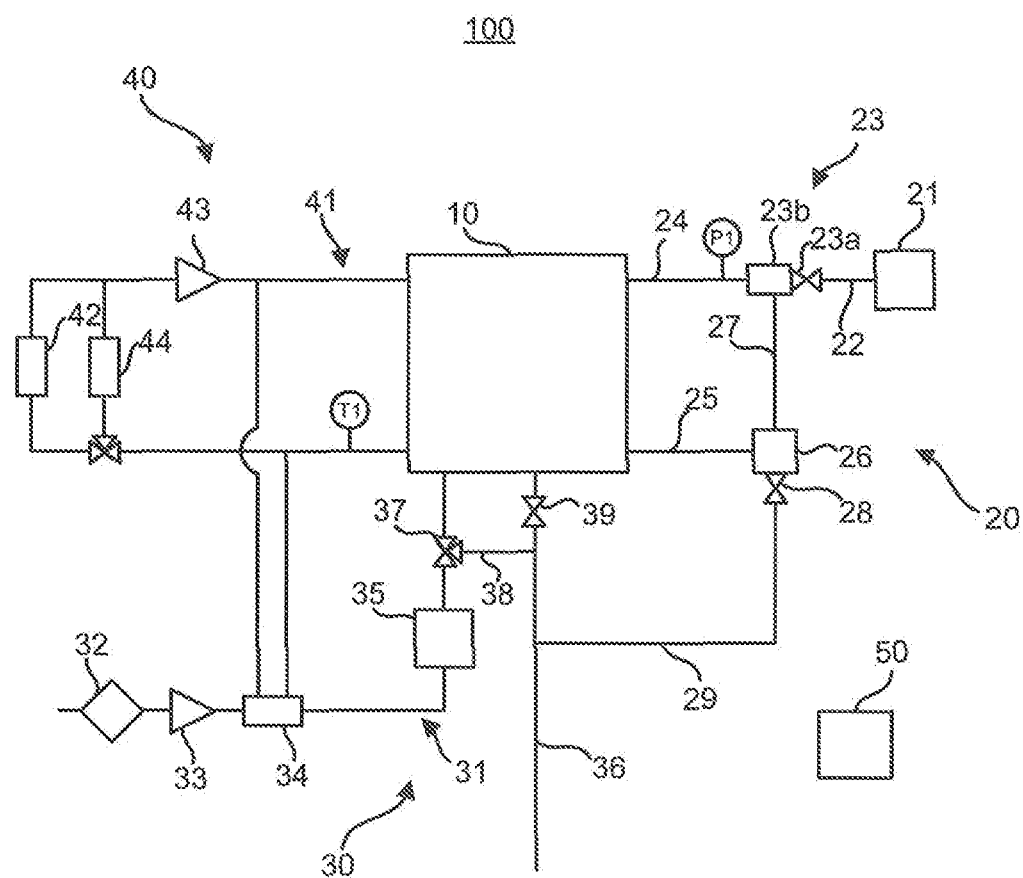
FIG. 1 is a block diagram of a fuel cell system 100.

A fuel cell system according to the present disclosure will be described, using a fuel cell system 100 that is one embodiment. FIG. 1 is a block diagram simply showing the fuel cell system 100.

As in FIG. 1, the fuel cell system 100 is provided with a fuel cell stack 10, a fuel gas pipe section 20, an oxidant gas pipe section 30, a cooling water pipe section 40 and a controlling unit 50.

<Fuel Cell Stack 10>

The fuel cell stack 10 is made by stacking a plurality of fuel cells in series. Each of the fuel cells has an electrolyte membrane, an anode electrode that is disposed on one side of the electrolyte membrane, and a cathode electrode that is disposed on the other side of the electrolyte membrane. Specifically, catalyst layers are disposed on both sides of the electrolyte membrane; diffusion layers are disposed on the outsides of the catalyst layers; and further separators where fuel gas passages and oxidant gas passages are formed are disposed on the outsides of the diffusion layers. Such structure of the fuel cell is general. Here, in the fuel cell, the catalyst layers and the diffusion layers function as the anode electrode or the cathode electrode.

The electrolyte membrane, the catalyst layers, the diffusion layers and the separators disposed in the fuel cell are not particularly limited. Any known ones may be used as them. Examples of the electrolyte membrane include ion exchange membranes made from solid polymer materials. Examples of a catalyst for the catalyst layers include platinum-based catalysts. Examples of a material for the diffusion layers include pours materials such as carbon materials. Examples of a material for the separators include metallic materials such as stainless steel, and carbon materials such as carbon composite materials.

In the fuel cell stack 10, a fuel gas supplied to the anode electrode and an oxidant gas supplied to the cathode electrode cause an electrochemical reaction to generate electricity. For example, when the fuel cell system 100 is installed in a vehicle, the generated electric current is used for a power load provided in the vehicle, or stored in a battery.

<Fuel Gas Pipe Section 20>

The fuel gas pipe section 20 is for supplying a fuel gas to the anode electrode of the fuel cell stack 10. The fuel gas pipe section 20 is provided with a fuel gas supply source 21, a fuel gas supply device 23 that is configured to supply the fuel gas to the fuel cell stack 10, a passage 22 that is a pipe connecting the fuel gas supply source 21 and the fuel gas supply device 23, a fuel gas supply passage 24 that is a pipe connecting the fuel cell stack 10 and the fuel gas supply device 23, a gas-liquid separator 26 that is configured to separate a liquid component from the fuel gas (fuel off-gas) drained from the fuel cell stack 10, a fuel gas draining passage 25 that is a pipe connecting the fuel cell stack 10 and the gas-liquid separator 26, a circulation passage 27 that is a pipe connecting the gas-liquid separator 26 and the fuel gas supply device 23, a gas and water draining valve 28 that is connected to the gas-liquid separator 26, and a gas and water draining passage 29 that is a pipe connected to the gas and water draining valve 28. The fuel gas pipe section 20 may be also provided with members which the fuel gas pipe section is generally provided with. Here, a fuel gas is a hydrogen gas or the like.

For example, the fuel gas supply source 21 is formed of a high pressure hydrogen tank, a hydrogen storage alloy, etc. For example, a 35 MPa or 70 MPa hydrogen gas is stored in the fuel gas supply source 21.

The passage 22 connects the fuel gas supply source 21 and the fuel gas supply device 23. In the passage 22, the fuel gas flows from the fuel gas supply source 21 to the fuel gas supply device 23. The passage 22 may be provided with a shutoff valve that controls opening and closing of the fuel gas supply source 21, and/or a regulator that controls the pressure of the fuel gas.

The fuel gas is supplied to the fuel cell stack 10 by means of the fuel gas supply device 23. The fuel gas supply device 23 has an injector 23a and an ejector 23b. As described later, the number of the fuel gas supply device 23 may be plural. The supply of the fuel gas is controlled by means of the injector 23a. Examples of the injector 23a include an on-off valve and a solenoid valve. The ejector 23b is connected to both the fuel gas supply passage 24 and the circulation passage 27. The ejector 23b is a structure for mixing a circulated gas circulated from the circulation passage 27 and the fuel gas supplied from the injector 23a, and supplying the resultant gas to the fuel gas supply passage 24. Such an ejector 23b is known.

The fuel gas supply passage 24 is a pipe connecting the fuel cell stack 10 and the fuel gas supply device 23. A pressure measuring device P1 configured to measure the pressure of the fuel gas supplied to the fuel cell stack 10 is disposed in the fuel gas supply passage 24. Results measured by means of the pressure measuring device P are transmitted to the controlling unit 50. The placement position of the pressure measuring device P is not limited to a position in the fuel gas supply passage 24, or is not particularly limited as long as the pressure of the fuel gas supplied to the fuel cell stack 10 can be measured. For example, the pressure measuring device P may be disposed in the fuel gas draining passage 25 or the circulation passage 27.

The fuel gas draining passage 25 is a pipe connecting the fuel cell stack 10 and the gas-liquid separator 26. In the fuel gas draining passage 25, the fuel gas (fuel off-gas) drained from the fuel cell stack 10 and water generated by the electrochemical reaction flow.

Gas and liquid components are separated from the fuel off-gas drained from the fuel cell stack 10 by means of the gas-liquid separator 26. The separated gas component (circulated gas) is circulated through the circulation passage 27. The separated liquid component is drained from the gas and water draining passage 29, along with the gas component. A known one may be used for such a gas-liquid separator 26. The major constituent in the liquid component is water generated by the electrochemical reaction in the fuel cell. The major constituent in the gas component is the fuel gas.

The circulation passage 27 is a pipe connecting the gas-liquid separator 26 and the fuel gas supply device 23. The circulated gas supplied from the gas-liquid separator 26 is circulated to the fuel gas supply device 23 (ejector 23b) through the circulation passage 27. The circulation passage 27 may be provided with, for example, a pump for power for circulating the circulated gas.

The gas and water draining valve 28 is a valve connecting the gas-liquid separator 26 and the gas and water draining passage 29. Drainage of the liquid component stored in the gas-liquid separator 26 is controlled according to opening and closing of the gas and water draining valve 28. When the liquid component is drained, the gas component is also drained. Opening and closing of the gas and water draining valve 29 are controlled by the controlling unit 50.

The gas and water draining passage 29 is a pipe connected to the gas and water draining valve 28 and an oxidant gas draining passage 36. The gas and liquid components drained by the opening of the gas and water draining valve 28 are drained to the outside via the gas and water draining passage 29 and the oxidant gas draining passage 36.

<Oxidant Gas Pipe Section 30>

The oxidant gas pipe section 30 is for supplying an oxidant gas to the cathode electrode. The oxidant gas pipe section 30 is provided with an oxidant gas supply passage 31 that is a pipe where an oxidant gas flows to the cathode electrode, an air cleaner 32 that is disposed in the oxidant gas supply passage 31, an inflater 33 that is disposed on the downstream side of the air cleaner 32, an intercooler 34 that is disposed on the downstream side of the inflater 33, a humidifier 35 that is disposed on the downstream side of the intercooler 34, and the oxidant gas draining passage 36 that is a pipe for draining the oxidant gas (oxidant off-gas) drained from the cathode electrode. The oxidant gas pipe section 30 may be also provided with members which the oxidant gas pipe section is generally provided with.

The oxidant gas supply passage 31 is a pipe for letting air taken in from the outside flow to the cathode electrode when, for example, the oxidant gas is air. The air cleaner 32 is a device configured to remove impurities in the oxidant gas. The inflater 33 is an oxidant gas supply device, and is configured to supply the oxidant gas to the cathode electrode. The temperature of the oxidant gas is controlled by means of the intercooler 34, as cooling water supplied from the cooling water pipe section 40 is used, which will be described later. The humidifier 35 is disposed in the oxidant gas supply passage 31, and is a device configured to control the humidity of the oxidant gas supplied to the cathode electrode. In addition to a passage where the oxidant gas is humidified, a passage (bypass passage) not relating to humidification is also provided in the humidifier 35. The proportions of the oxidant gas passing through these passages are controlled by means of a valve or the like, which makes it possible to control the humidity of the oxidant gas supplied to the cathode electrode. The oxidant gas draining passage 36 is a pipe for draining the oxidant gas drained from the cathode electrode. The gas and water draining passage 29 is connected in the middle of the oxidant gas draining passage 36. The liquid and gas components drained from the gas and water draining passage 29 are drained to the outside together from the oxidant gas draining passage 36.

Here, in the oxidant gas supply passage 31, a diverter valve 37 may be provided between the humidifier 35 and the cathode electrode. A bypass passage 38 that is connected to the oxidant gas draining passage 36 is connected to the diverter valve 37. Adjusting the opening degree of the diverter valve 37 can result in adjusting the pressure of the oxidant gas supplied to the cathode electrode. A pressure regulating valve 39 may be disposed at an outlet of the cathode electrode in the oxidant gas draining passage 36. Adjusting the opening degree of the pressure regulating valve 39 can result in adjusting the pressure of the oxidant gas supplied to the cathode electrode, and the pressure of the oxidant off-gas drained from the cathode electrode.

<Cooling Water Pipe Section 40>

The cooling water pipe section 40 is for cooling the fuel cell stack 10 via cooling water. The cooling water pipe section 40 is provided with a cooling water passage 41, a radiator 42, a cooling water supply device 43, and an ion exchanger 44. The cooling water pipe section 40 may be also provided with members which the cooling water pipe section is generally provided with.

The cooling water passage 41 is a pipe for connecting an inlet and outlet of a cooling water passage in the fuel cell stack 10, and circulating cooling water. By means of the radiator 42, heat is exchanged between the cooling water flowing in the cooling water passage 41, and the outside air, to cool the cooling water. The cooling water supply device 43 is for power for the cooling water circulating through the cooling water passage 41. The ion exchanger 44 is for removing impurities in the cooling water. As described above, the cooling water passage 41 is connected to the intercooler 34, to supply the cooling water to the intercooler 34. The cooling water passage 41 may be connected to an air conditioning heater circuit or the like for efficient use of the cooling water after the heat exchange with the fuel cell stack 10.

In the cooling water passage 41, a cooling water temperature measuring device T1 configured to measure the temperature of the cooling water is disposed on the outlet side of the cooling water passage in the fuel cell stack 10. Heat is fully exchanged between the cooling water drained from the cooling water passage in the fuel cell stack 10, and the fuel cell stack 10, so that the temperature of the foregoing cooling water is equal to that of the fuel cell stack 10. Thus, measuring the temperature of the foregoing cooling water can result in measuring the fuel cell stack 10. The measurement results are transmitted to the controlling unit 50.

<Controlling Unit 50>

The controlling unit 50 is a computing system including a CPU, a ROM, a RAM, an input-output interface, etc., and controls each section of the fuel cell system 100.

The controlling unit 50 controls pulsed operation of the fuel gas supply device 23 in such a way that the pressure measured by means of the pressure measuring device P1 is within the range of a preset upper limit pressure and lower limit pressure. The feature of the controlling unit 50 is to use a flow rate increasing control to increase the supply of the fuel gas by means of the fuel gas supply device 23 at least once when the pressure rises in the pulsed operation before the pressure (the pressure for the pulsed operation) reaches the upper limit pressure, as long as the pressure does not exceed the upper limit pressure. The fuel cell system 100 including such a controlling unit 50 can offer fuel efficiency and water drainage performance which are compatible with each other. Hereinafter detailed description thereof will be given.

Figure 2A:
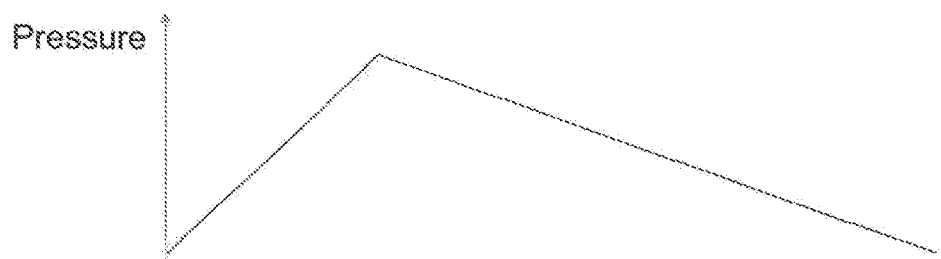
FIGS. 2A to 2D explanatorily show pulsed operation.
Figure 2B:
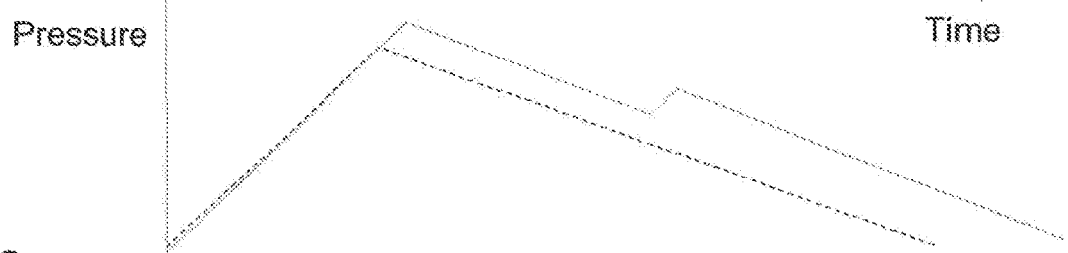
Figure 2C:
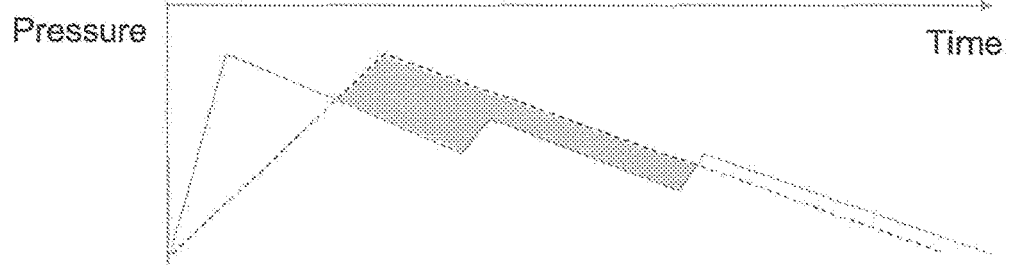
Figure 2D:
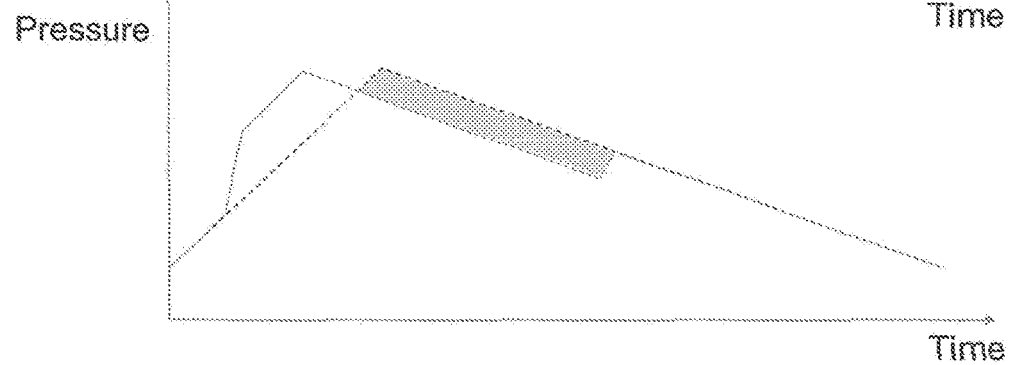

FIGS. 2A to 2D explanatorily show pulsed operation in a conventional fuel cell system, and the pulsed operation in the fuel cell system 100. FIG. 2A explanatorily shows normal pulsed operation. FIGS. 2B and 2C explanatorily show pulsed operation using a predetermined control for improving the water drainage performance. FIG. 2D explanatorily shows the pulsed operation of the fuel cell system 100. FIGS. 2A to 2D all show one period of the pulsed operation. The dotted lines shown in FIGS. 2B to 2D represent the pulsed operation in FIG. 2A.

Pulsed operation is to control operation and suspension of the fuel gas supply device, so that the pressure of the fuel gas periodically rises and falls. As shown in FIG. 2A, in normal pulsed operation, the fuel gas supply device is operated, the pressure is raised from a predetermined lower limit pressure at a constant rate, and the fuel gas supply device is suspended when the pressure reaches the upper limit pressure. When the fuel gas supply device is suspended, the pressure starts to fall. When the pressure reaches a predetermined lower limit pressure, the fuel gas supply device is operated again to raise the pressure. The period and the magnitude of the pulsed operation (including the rates at which the pressure rises and falls, and the lower and upper limit pressures) are suitably set according to the composition and the purpose of the fuel cell system.

FIG. 2B shows an example where the injection time of the fuel gas is lengthened, and the water drainage performance is improved. Like this, the lengthened injecting time of the fuel gas raises the upper limit pressure. This may increase the amount of fuel gas cross leakage into the cathode electrode side to deteriorate fuel efficiency. This may also lead to a longer pressure falling time (gas suspension time) from the upper limit pressure to the lower limit pressure to form a portion in the system where the fuel gas runs short. Thus, in order to avoid this, in FIG. 2B, the fuel gas is additionally injected during the pressure falling. However, such an additional injection increases the number of times the fuel gas supply device operates, which leads to deteriorated durability. An additional injection itself also causes fuel efficiency to deteriorate. Increase of the amount of fuel gas cross leakage due to the additional injection is also concerned.

FIG. 2C shows an example where the upper limit pressure is maintained and also the pressure rising rate is increased. Like this, the increase in the pressure rising rate can improve the water drainage performance. However, the proportion of circulating flow rate of the fuel gas in the system lowers, which may lead to formation of a portion where the fuel gas runs short during the pressure falling. Thus, in order to avoid this, in FIG. 2C, the fuel gas is additionally injected twice during the pressure falling.

As shown in FIGS. 2B and 2C, according to the way of increasing the upper limit pressure for the pulsed operation, and the way of increasing the pressure rising rate, the performance of draining water in the anode of the fuel cell stack can be improved, but fuel efficiency etc. deteriorate.

In contrast, in the fuel cell system 100, as shown in FIG. 2D, the flow rate increasing control to increase the supply of the fuel gas by means of the fuel gas supply device 23 is used at least once when the pressure rises in the pulsed operation before the pressure reaches the upper limit pressure, as long as the pressure does not exceed the upper limit pressure. Such a flow rate increasing control can momentarily increase the amount of the fuel gas supplied to the fuel cell stack 10, to efficiently drain water from the inside of the fuel cell stack. Such a flow rate increasing control is used as long as the pressure does not exceed the upper limit pressure for the pulsed operation, which does not deteriorate fuel efficiency or hardly increase the amount of hydrogen cross leakage. In addition, such a flow rate increasing control is a method capable of relatively ensuring the proportion of circulating flow rate, which thus hardly increase formation of a portion where the fuel gas runs short in the fuel cell stack 10 during the gas supply suspension period. Therefore, the pulsed operation in the fuel cell system 100 can offer fuel efficiency and water drainage performance which are compatible with each other.

In the flow rate increasing control, the fuel gas flow rate to be increased is not particularly limited as long as the pressure does not exceed the upper limit pressure. For example, the fuel gas flow rate to be increased may be equal to the capacity in the anode of the fuel cell stack. The number of times the flow rate is increased is not particularly limited, but may be determined in view of the composition of the fuel cell system, the water drainage performance and durability of the fuel gas supply device 23, etc.

For example, such a flow rate increasing control may be achieved in the following structure. FIG. 3 shows an example where the fuel gas supply device 23 is provided with a linear solenoid valve 23c as the injector. As shown in the bottom in FIG. 3, the controlling unit 50 adjusts the opening degree of the linear solenoid valve 23c, which makes it possible to use the flow rate increasing control.

Figure 4:
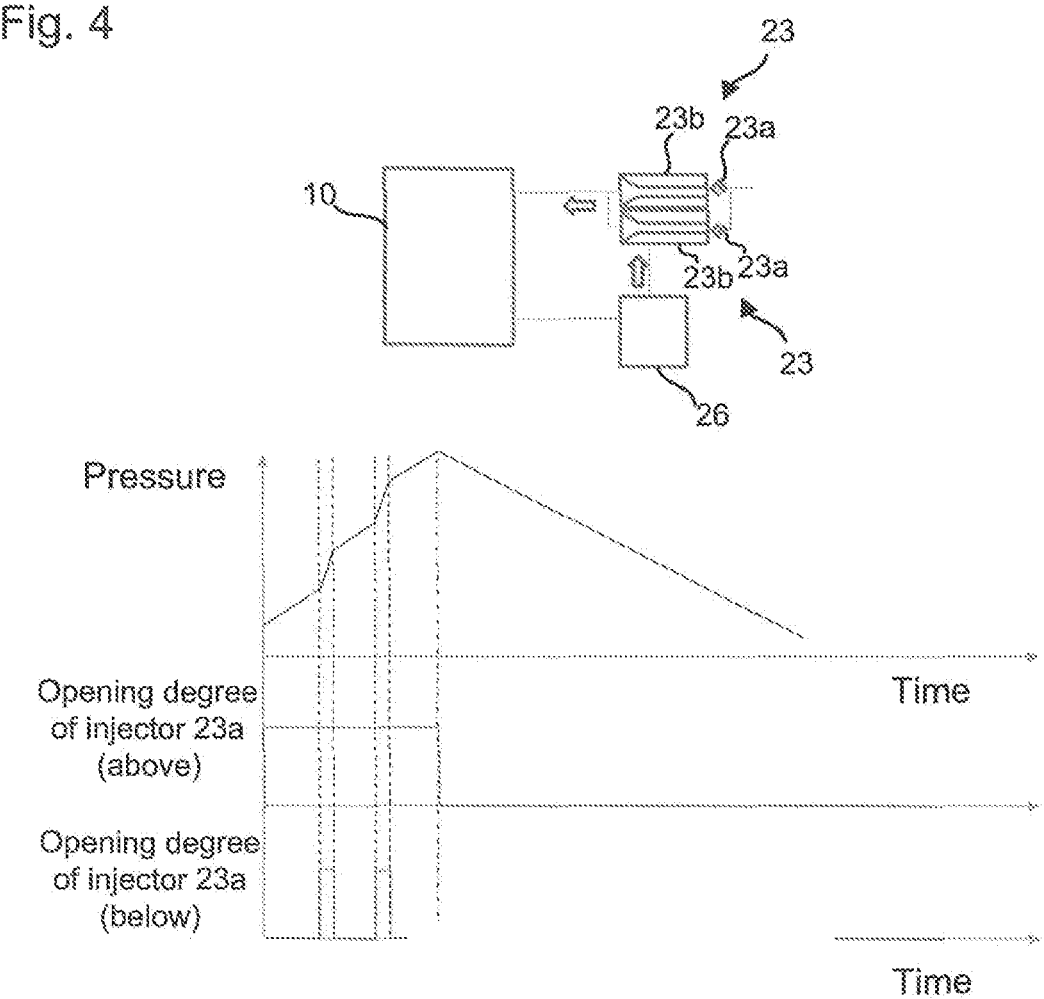
FIG. 4 shows another example of structure for a flow rate increasing control.

Further, another example where a plurality of the fuel gas supply device 23 are disposed will be shown. FIG. 4 shows an example where the number of the disposed fuel gas supply device 23 is two. As shown in the bottom in FIG. 4, the controlling unit 50 controls the fuel gas supply device 23 in such a way that one of the fuel gas supply device 23 performs the pulsed operation, and the flow rate increasing control is used by means of the other fuel gas supply device 23. Unlike the example shown in FIG. 3, the injectors 23a included in the fuel gas supply device 23 are usually on-off valves, so that the opening degrees of the valves cannot be adjusted. Therefore, in this other example, the two fuel gas supply device 23 are disposed for using the flow rate increasing control. When the number of the disposed fuel gas supply device 23 are at least three, the controlling unit 50 controls the fuel gas supply device 23 in such a way that at least one of the plural fuel gas supply device 23 performs the pulsed operation, and the flow rate increasing control is used by means of at least one of the rest of the fuel gas supply device 23. The plural fuel gas supply device 23 may all have the same structure, or may have different structures. For example, the plural fuel gas supply device 23 having different supplies of the fuel gas may be used.

The flow rate increasing control may be used anytime the fuel cell system 100 is during operation. For example, the flow rate increasing control may be used when water collects in the fuel cell stack 10, or may be preventively used, so that water does not collect in the fuel cell stack 10. It is preferable to use the flow rate increasing control when water collects in the fuel cell stack 10 for reducing the number of times the fuel gas supply device 23 operates to ensure durability.

Whether water collects in the fuel cell stack 10 or not may be presumed from the temperature of the fuel cell stack 10. When the fuel cell stack 10 is at a lower temperature, water tends to collect in the anode. When the fuel cell stack 10 is at a higher temperature, water tends not to collect in the anode. Therefore, it is sufficient that the controlling unit 50 uses the flow rate increasing control when the temperature of the fuel cell stack 10 is lower than a predetermined threshold. Here, as described above, the measurement value of the cooling water temperature measuring device T1 can be regarded as the temperature of the fuel cell stack 10. The foregoing predetermined threshold may be suitably set in view of, for example, the composition and performance of the fuel cell system 100.

Figure 5:
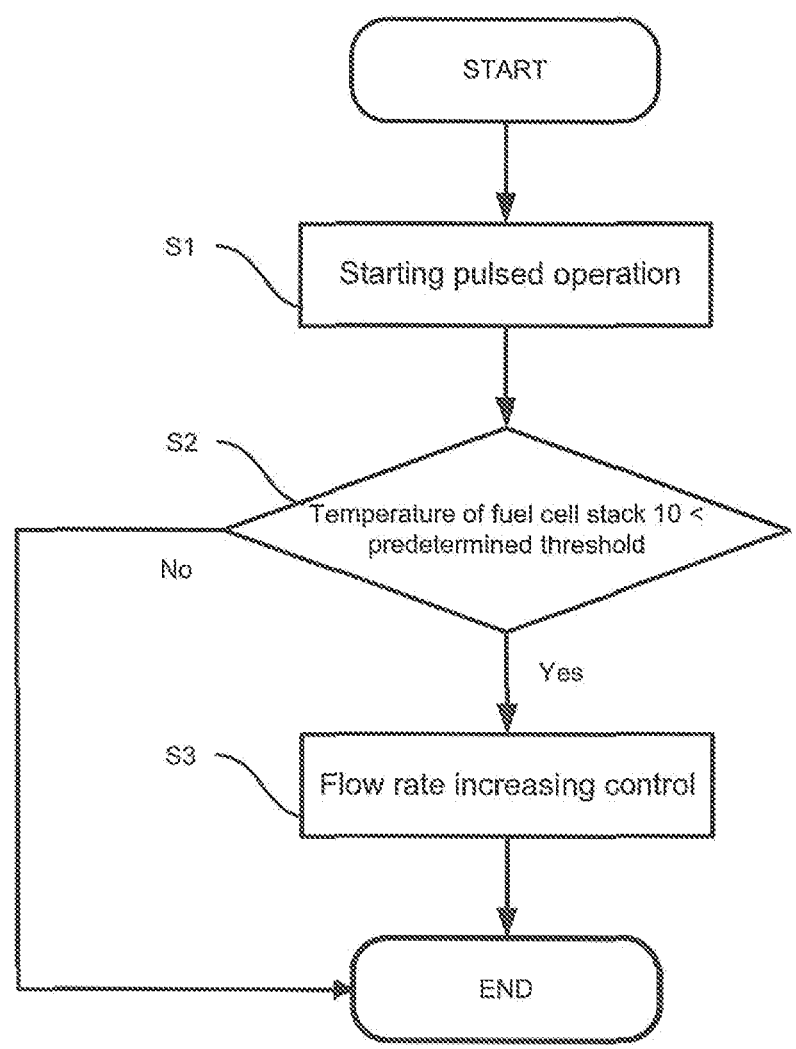
FIG. 5 shows one example of a processing routine for the flow rate increasing control.

FIG. 5 shows one example of a processing routine used for the flow rate increasing control by the controlling unit 50 when the temperature of the fuel cell stack 10 is lower than a predetermined threshold. As in FIG. 5, the processing routine by the controlling unit 50 include steps S1 to S3. The controlling unit 50 repeatedly uses these steps.

In the step S1, the pulsed operation is started by means of the fuel gas supply device 23 in accordance with a command from the controlling unit 50. Sequentially, in the step S2, whether the temperature of the fuel cell stack 10 is lower than a predetermined threshold or not is determined. When it is determined that the temperature of the fuel cell stack 10 is lower than a predetermined threshold in the step S2, the step S3 is carried out. In the step S3, the flow rate increasing control is used in accordance with a command from the controlling unit 50.

Industrial Applicability

As described above, the fuel cell system according to the present disclosure has been described, using the fuel cell system 100, which is one embodiment. The fuel cell system according to the present disclosure can offer fuel efficiency and water drainage performance which are compatible with each other, and thus can be said to be an important art in any technical field relating to the fuel cell system.

Reference Signs List

10 fuel cell stack
20 fuel gas pipe section
21 fuel gas supply source
22 passage
23 fuel gas supply device
23*a* injector
23*b* ejector
24 fuel gas supply passage
25 fuel gas draining passage
26 gas-liquid separator
27 circulation passage
28 gas and water draining valve
29 gas and water draining passage
30 oxidant gas pipe section
31 oxidant gas supply passage
32 air cleaner
33 inflater
34 intercooler
35 humidifier
36 oxidant gas draining passage
37 diverter valve
38 bypass passage
39 pressure regulating valve
40 cooling water pipe section
41 cooling water passage
42 radiator
43 cooling water supply device
44 ion exchanger
50 controlling unit
100 fuel cell system

What is claimed is:

1. A fuel cell system comprising:
a fuel cell stack;
a fuel gas supply device for supplying a fuel gas to the fuel cell stack;
a fuel gas supply passage connecting the fuel cell stack and the fuel gas supply device;
a gas-liquid separator configured to separate a liquid component from the fuel gas drained from the fuel cell stack;
a fuel gas draining passage connecting the fuel cell stack and the gas-liquid separator;
a circulation passage connecting the gas-liquid separator and the fuel gas supply device;
a pressure measuring device disposed in any of the fuel gas supply passage, the fuel gas draining passage and the circulation passage; and
a controlling unit, wherein
the controlling unit controls pulsed operation of the fuel gas supply device in such a way that a pressure measured by means of the pressure measuring device is within a range of a preset upper limit pressure and lower limit pressure, and
the controlling unit uses a flow rate increasing control at least once when the pressure rises in the pulsed operation before the pressure reaches the upper limit pressure, as long as the pressure does not exceed the upper limit pressure, the flow rate increasing control being to increase a supply of the fuel gas supplied by means of the fuel gas supply device, wherein
the controlling unit uses the flow rate increasing control when a temperature of the fuel cell stack is lower than a predetermined threshold.

2. The fuel cell system according to claim 1, wherein
the fuel gas supply device includes a linear solenoid valve, and
the controlling unit adjusts an opening degree of the linear solenoid valve to use the flow rate increasing control.

3. The fuel cell system according to claim 1, wherein
a number of the disposed fuel gas supply device are plural, and
the controlling unit controls the fuel gas supply device in such a way that at least one of the fuel gas supply device performs the pulsed operation, and the flow rate increasing control is used by means of at least one of the rest of the fuel gas supply device.

* * * * *